March 11, 1941.　　　E. ROTHFELD　　　2,234,653
SPEED CHANGE GEARS
Filed Sept. 10, 1938　　　2 Sheets-Sheet 1

March 11, 1941. E. ROTHFELD 2,234,653
SPEED CHANGE GEARS
Filed Sept. 10, 1938 2 Sheets-Sheet 2

Patented Mar. 11, 1941

2,234,653

UNITED STATES PATENT OFFICE 2,234,653

SPEED CHANGE GEARS

Erich Rothfeld, Niederau, near Meissen, Germany

Application September 10, 1938, Serial No. 229,298
In Germany May 25, 1937

4 Claims. (Cl. 74—348)

This invention relates to improvements in speed change gears.

It is an object of the invention to provide a change speed gearing in which a variation in the speed of driving and driven elements is induced by forming one of the gear elements as a series of teeth, which series is wound in helical formation about an axis, and the turns of the helix gradually decrease in diameter from one end of the helix towards the other, the other gear element being axially and slidably related to the gear element of the conical helical formation described and being in constant mesh therewith.

It is another object of the invention to improve change speed gears of the described type by continuously maintaining the engagement between the elements of the change speed gearings, as contrasted with prior change speed gearings comprising conical helical series of gear teeth in which during the operation repeatedly and periodically interruptions of the engagement between the two elements occur.

It is, furthermore, an object of the invention to provide a change speed gearing of the character described, in which the turns of the conical helix are uniformly spaced axially along the axis of the imaginary cone surrounded by the helix, while the companion element of the gearing has an axial height equal to the axial height of the gears of the helical series and in a certain relation to the spacing of the turns of the helical series along the axis of the helix.

With these and other objects in view, embodiments of the invention are described in the following specification, in which reference is made to the accompanying drawings.

Figure 1:
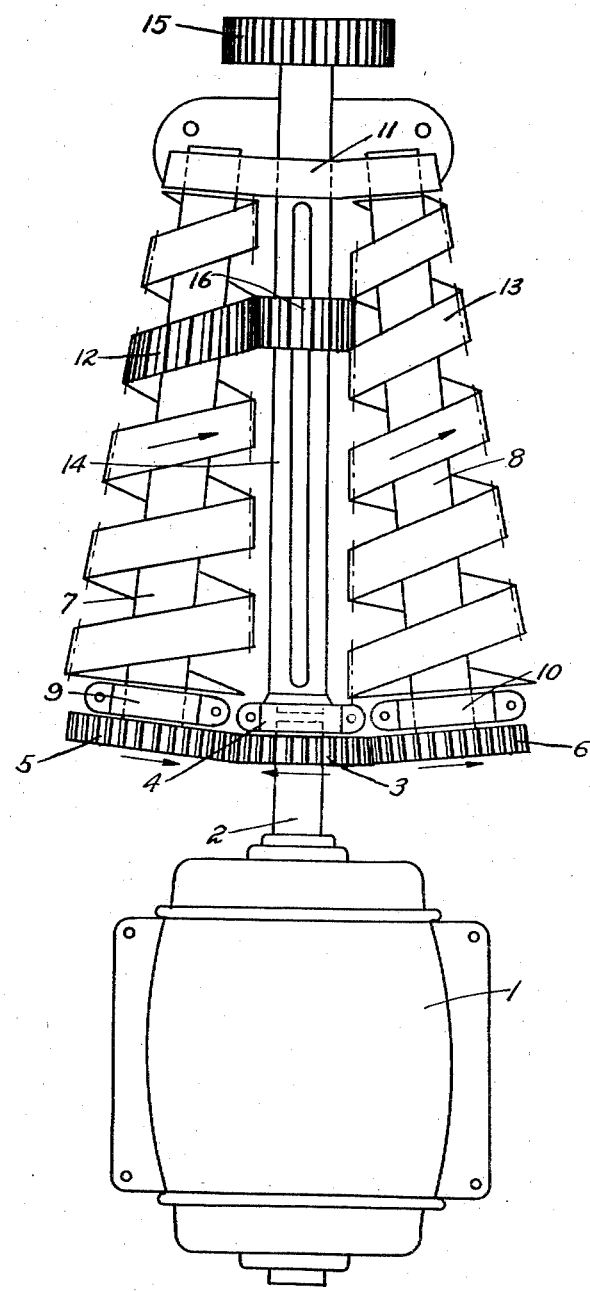
Figure 2:
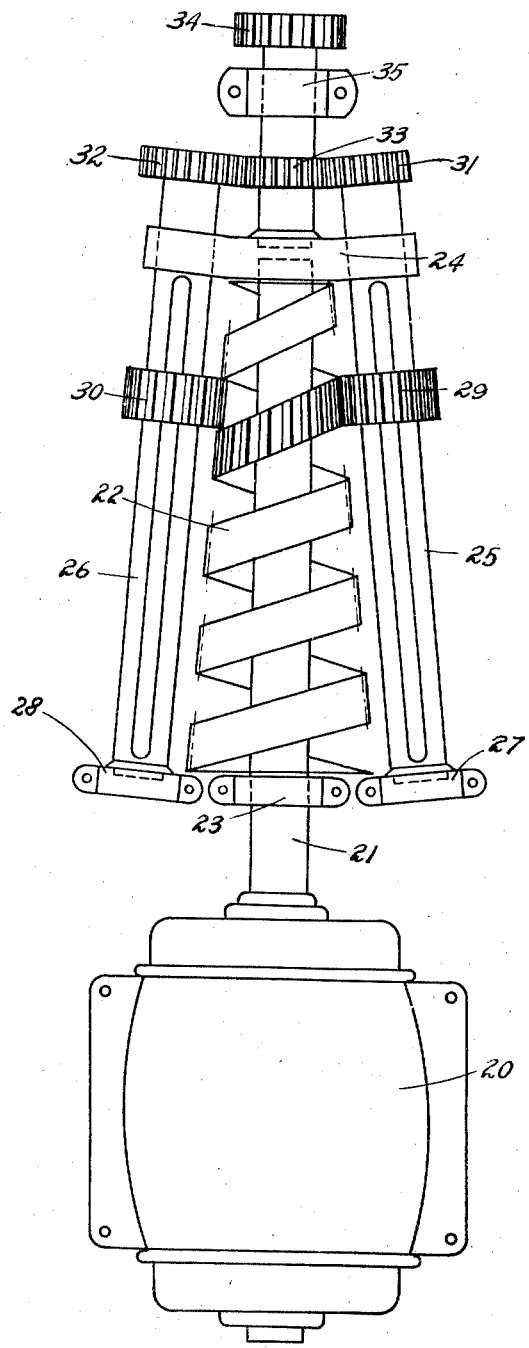

The accompanying drawings show:

In Fig. 1 an elevation of one form of a change speed gearing of this character, and Fig. 2 shows in elevation another form of the gearing.

A motor 1, here illustrated as an electric motor, has mounted on the projecting end of the armature shaft 2 a bevel pinion 3, the projecting end of the shaft being supported in a bearing diagrammatically indicated at 4. The bevel pinion 3 is in operative engagement with bevel pinions 5 and 6 mounted on the ends of shafts 7 and 8 respectively which are rotatably supported in bearings 9 and 10 at one end thereof, while the opposite ends are rotatably mounted in a bearing 11 shown here as being adapted to support the ends of both of said shafts 7 and 8.

Each of the shafts 7 and 8 serves as a support for a series of gear teeth 12 and 13, which series is wound helically about the shaft, the diameter of the respective helix decreasing, however, uniformly from one end thereof towards the opposite end, so that each of these series of helical teeth appears as a helix wound about an imaginary truncated cone.

It will be seen in the drawings that the several turns of each helix are uniformly spaced from each other axially of this cone, and that the individual turns of the helix extend equidistantly about the circumference of said cone. When the pitch of the helix is defined as the product of the circumference by the tangent of the angle of inclination, it will be seen that this pitch varies in spite of the angle of inclination remaining uniform over the entire length of the helix. The variation is due to the fact that the circumference gradually decreases from one end towards the other, the angle remaining the same.

It will also be seen that the spacing between adjacent turns of the helix is twice as great as the axial height of the teeth of which the helix is composed, this spacing being indicated at $x$ and the height of the teeth being indicated at $y$, the values of $x$ and $y$ remaining uniform over the entire length of the helix.

The driven element is formed by a pinion 16 in mesh with the teeth of the helix and axially slidable but rotatively fixed on a shaft 14 which, as shown in Fig. 1, is supported in the bearing 4 and in the bearing 11 which also serve as supporting elements for other members of the change speed gearing. The shaft 14 carries at the end projecting from the bearing 11 a spur gear or other element 15 to which the speed transmitted from the motor 1 is communicated at a rate varying with the position of the driven pinion 16 in respect of the ends of the helix.

It will also be seen from Fig. 1 that the shafts 7 and 8 are inclined relatively to each other in such manner that the points of engagement between the driven pinion 16 and the gear teeth 12 and 13 of the two helices are located on lines parallel to the axis of the driven shaft 14. The axes of the three shafts may be considered as having a single point of intersection.

Owing to the relative dimensions of the driven pinion 16 and the driving helices 12 and 13, the ratio of transmission between driving and driven members of the change speed gearing may be altered continuously, as contrasted with the change speed gears in which a step by step alteration only of said ratio is made feasible. This is due to the fact that the axial height of the teeth of the driven pinion 16 corresponds to the axial height of the teeth 12 and 13 on the two helical series, and that the turns of the series are uniformly spaced from each other a distance equal twice the axial height of the teeth of the helices 12 and 13. There is no instant during operation at which the pinion 16 would be out of engagement with either one or both of the helical series of teeth 12 and 13. Furthermore, it will be obvious that upon displacing the driven pinion 16 in axial direction from full engagement with the teeth of one helix, as for instance, the helix 12, another full engagement of the driven pinion 16 with the teeth of the same helix cannot recur until the pinion 16 has been in full engagement with the teeth of the other helix 13. At any instant of operation, therefore, the entire width of the driven pinion 16 is utilized for absorbing the force of the driving members of the gearing.

In the embodiment illustrated in Fig. 1, the smallest diameter of the helix 12 or 13 corresponds approximately to the diameter of the driven pinion 16. But when the driven pinion 16 is moved towards the larger end of the helix, the ratio of transmission may be approximately 1 to 2, and this variation of the ratio of transmission may be effected gradually and uninterruptedly.

Owing to this uniform change of the ratio of transmission, the transmission of power from the driving to the driven member of the gearing remains uniform, and no shocks or backlash conditions can occur during the operation.

Upon selecting an angle of the helix of relatively small value at the apex of the cone of the helix, the teeth of the helix may have uniform height in axial direction of the cone over the entire length of the helix. A variation in the height of the teeth will practically not become necessary. When required, however, the teeth may be undercut so that the driven pinion engages the teeth of the driving members without any play.

In the embodiment illustrated in Fig. 2, the motor 20 rotates the motor shaft 21 on which the helical series of gears in the form of a conical helix 22 is mounted. This shaft may be supported in the bearing 23 at one end and in another bearing 24 at the opposite end. Here also it will be noticed that the diameter of the turns of the helix increases uniformly in direction from the outer end of the shaft towards the end adjacent the motor thereof, and it also will be noticed that the spacing of the turns of the helix is twice the axial height of the teeth of the helix.

A pair of shafts 25, 26 is rotatably supported at one end in the bearing 24 in which also one end of the shaft 21 is rotatably supported while the other ends of the shafts 25, 26 are rotatably carried in bearings 27, 28 respectively. These shafts are inclined with respect to the axis of the shaft 21 at an angle corresponding to the cone angle of the helix 22. The shafts 25 and 26 mount pinions 29, 30 having an axial height corresponding to the axial height of the teeth on the helical series 22, and hence, therefore, also of a height corresponding to one-half the spacing between adjacent turns of the helix. They are fixed against rotation on the shafts 25, 26, but are axially slidable on said shafts.

The ends of the shafts 25, 26 are provided with bevel pinions 31, 32, both in engagement with a bevel pinion 33 mounted on a driven shaft 34 which may be supported in a bearing 35.

In this embodiment, therefore, the power of the motor 20 is transmitted at a varying ratio of transmission to the pinions 29, 30, which may be selectively positioned axially of their shafts 25, 26 by elements not illustrated in the drawings. Here also it is obvious that upon axially shifting the pinions 29, 30, the variation of the ratio of transmission occurs gradually and uninterruptedly and that the entire power derived from the motor 20 will be transmitted to the driven bevel pinion 33.

It is obvious, furthermore, that for instance in Fig. 1, the driven pinion 15 may again constitute a source of power to which another change speed gearing of the same construction may be connected, so that a plurality of change speed gears may be serially disposed whenever desired. It is, furthermore, obvious that in place of a single pair of helices, as illustrated in Fig. 1 having their axes in a plane in which also the axis of the shaft 14 is located, additional helices may be grouped about the axis of the shaft 14, so that more than two helices act upon the driven member 16 of the change speed gearing. Similarly also in the embodiment illustrated in Fig. 2, a plurality of pinions 29, 30 and the pertaining supporting structures may be grouped about the single helix 22 so as to render the change speed gearing suitable for the transmission of relatively heavy forces without producing obnoxious shocks or backlash conditions whenever the driven member or members of the gearing should pass from one turn of the driving member to the other.

It is also obvious that upon displacing the slidable members in predetermined direction upon their shafts, a braking effect may be exerted upon the driving member of the gearing.

I claim:

1. A change speed gearing comprising a pair of series of helically disposed gear teeth, means for simultaneously rotating said two series of gear teeth about the axis of their respective helices, the diameters of the turns of the helices increasing uniformly in both series from one end to the other, the several turns in each helix being uniformly spaced from each other a distance twice as great as the axial length of the teeth of which the helix is composed, the axes of the helices being inclined towards each other, so that the distance between the circumferences of the two helices is uniform throughout the entire length of the same, a shaft extending in a direction bisecting the angle formed by the axes of the two helices, and a spur pinion slidably mounted on said shaft and rotatably fixed with respect thereto, and meshing with the teeth of each of said helical series of teeth, the axial length of the teeth on the pinion corresponding to the axial length of the teeth in the helices, the helices on said first named axes being angularly offset with respect to each other in such manner that upon displacement of the spur pinion on its shaft, said spur pinion will at no time be out of engagement with at least one turn of the helices.

2. A change speed gearing comprising a pair of driving shafts angularly inclined with respect to each other, a driven shaft located in the plane defined by the axes of the driving shafts, a plurality of gear teeth associated with each of said driving shafts, said gear teeth being arranged in series helically wound each about the pertaining driving shaft with the diameters of the turns of each helix increasing gradually from one end to the other and in the same direction on both of said shafts, the spacing of the several turns in each helix being twice as great as the axial length of the teeth of which the series of teeth is composed, and a spur pinion on the third shaft slidably mounted thereon and fixed against rotation with respect thereto and meshing with the teeth in each of said helices, whereby upon rotation of the first named shafts, the third shaft will be imparted rotation through said pinion, the ratio of speed transmission depending upon the position of said pinion with respect to the helix on each of said first named shafts the axial length of the teeth on the spur pinion being the same as the axial length of the teeth in the helices, the helices on said first named axes being angularly offset with respect to each other in such manner that upon displacement of the spur pinion on its shaft, said spur pinion will at no time be out of engagement with at least one turn of the helices.

3. A speed change gearing including a drive shaft, a driven shaft, and means operatively connecting said shafts with each other and adapted to vary gradually and continuously the speed ratio between said shafts, said means including a gearing consisting of at least three gears, all of said gears except one being of the same size and construction and being drivingly connected with one of said shafts and meshing with the remaining other gear which is drivingly connected with the other one of said shafts, the gears drivingly connected with one of said shafts being provided with an uninterrupted series of gear teeth, said series having helical formation with the turns of the helix gradually increasing in diameter from one end of the series toward the other end, the several turns being uniformly spaced from each other in axial direction of the helix a distance equal to twice the height of the gear teeth measured in axial direction, and the gear drivingly connected with the other shaft being slidably adjustable with respect to the axis of said last named shaft so as to mesh with the helically arranged gear teeth at any desired diameter of the respective helices, said slidably adjustable gear having gear teeth equal in axial height to the gear teeth on the helices.

4. A speed change gearing including a drive shaft, a driven shaft, and means operatively connecting said shafts with each other and adapted to vary gradually and continuously the speed ratio between said shafts, said means including a gearing consisting of at least three gears, all of said gears except one being of the same size and construction and being drivingly connected with said drive shaft and meshing with the remaining other gear which is drivingly connected with said driven shaft, the gears drivingly connected with said drive shaft being each provided with an uninterrupted series of gear teeth, said series having helical formation with the turns of the helix gradually increasing in diameter from one end of the series toward the other end, the several turns being uniformly spaced from each other in axial direction of the helix a distance equal to twice the height of the gear teeth measured in axial direction, and the gear drivingly connected with the driven shaft being mounted slidably adjustably on the latter so as to mesh with the teeth on the other gears at any desired diameter of the respective helices, the gear teeth of said slidably adjustable gear having an axial height equal to the one of the gear teeth on the other gears.

ERICH ROTHFELD.